(12) United States Patent
Lennen et al.

(10) Patent No.: US 8,134,501 B2
(45) Date of Patent: Mar. 13, 2012

(54) METHOD AND APPARATUS FOR WEAK DATA FRAME SYNC IN A POSITIONING SYSTEM

(75) Inventors: Gary Lennen, Cupertino, CA (US); Makarand Phatak, Sunnyvale, CA (US); William Kerry Keal, Santa Clara, CA (US)

(73) Assignee: CSR Technology Holdings Inc., San Jose, CA (US)

( * ) Notice: Subject to any disclaimer, the term of this patent is extended or adjusted under 35 U.S.C. 154(b) by 0 days.

(21) Appl. No.: 13/083,498

(22) Filed: Apr. 8, 2011

(65) Prior Publication Data

US 2011/0193742 A1     Aug. 11, 2011

Related U.S. Application Data

(63) Continuation of application No. 12/277,044, filed on Nov. 24, 2008, now Pat. No. 7,924,220.

(51) Int. Cl.
*G01S 19/24* (2010.01)

(52) U.S. Cl. .................................. 342/357.63

(58) Field of Classification Search .............. 342/357.63
See application file for complete search history.

(56) References Cited

U.S. PATENT DOCUMENTS

| | | | |
|---|---|---|---|
| 5,402,441 A | 3/1995 | Washizu et al. | |
| 6,252,545 B1 | 6/2001 | Da et al. | |
| 6,295,023 B1 | 9/2001 | Bloebaum | |
| 6,611,756 B1 | 8/2003 | Chen et al. | |
| 6,965,760 B1 | 11/2005 | Chen et al. | |
| 7,142,157 B2 | 11/2006 | Garin et al. | |
| 7,161,977 B1 | 1/2007 | Jung | |
| 2002/0049536 A1 | 4/2002 | Gaal | |
| 2003/0058167 A1* | 3/2003 | Rabinowitz et al. | 342/464 |
| 2003/0152134 A1 | 8/2003 | Vorobiev et al. | |

(Continued)

FOREIGN PATENT DOCUMENTS

JP     2003084055     3/2003

(Continued)

OTHER PUBLICATIONS

Search Report issued Mar. 9, 2010 in corresponding GB 0920522.0.

(Continued)

*Primary Examiner* — Harry Liu
(74) *Attorney, Agent, or Firm* — Pillsbury Winthrop Shaw Pittman LLP

(57) ABSTRACT

The present invention is related to location positioning systems, and more particularly, to a method and apparatus of synchronizing to data frames in a positioning system signal. According to one aspect, the invention speeds up the frame synchronization process by computing a frame synchronization metric for each satellite and then combining together the metrics for all tracked satellites together, after compensating for respective signal transit times. Then the invention makes a frame sync decision on the combined satellite metric. In embodiments, an optimal combining algorithm is used based on CNO of each satellite. According to further aspects, the invention further speeds up the frame synchronization process by predicting many bits in the subframe so that more bits are known in addition to the 8-bit preamble. For example, the invention recognizes that many bits in a subframe rarely change or don't change very often. Moreover, the invention uses old ephemeris used to predict new ephemeris parameters. These parameters are translated into predicted bits in the signal. Still further, old ephemeris can be used to predict almanac parameters, and the almanac can be used to predict ephemeris parameters.

23 Claims, 12 Drawing Sheets

U.S. PATENT DOCUMENTS

| | | | |
|---|---|---|---|
| 2003/0227963 A1 | 12/2003 | Dafesh | |
| 2005/0031045 A1* | 2/2005 | Mayor et al. | 375/260 |
| 2005/0174284 A1 | 8/2005 | Abraham et al. | |
| 2006/0082496 A1 | 4/2006 | Winternitz et al. | |
| 2008/0002797 A1 | 1/2008 | Raman et al. | |
| 2008/0150797 A1 | 6/2008 | Jia et al. | |
| 2009/0016414 A1* | 1/2009 | Lillo et al. | 375/150 |
| 2009/0115660 A1 | 5/2009 | Garin et al. | |
| 2009/0284410 A1 | 11/2009 | Trautenberg | |
| 2009/0323512 A1* | 12/2009 | Murali et al. | 370/210 |

FOREIGN PATENT DOCUMENTS

| | | |
|---|---|---|
| JP | 2003098244 | 4/2003 |
| JP | 2007228327 A * | 9/2007 |
| JP | 2007240490 | 9/2007 |
| WO | WO 0223783 | 3/2002 |
| WO | WO 03100455 | 12/2003 |

OTHER PUBLICATIONS

Search Report issued Oct. 10, 2010 in corresponding Dutch application.

Berry, Matthew M., "A Variable-Step Double-Integration Multi-Step Integrator," Ph.D. Thesis, Virginia Polytechnic Institute, Apr. 16, 2004, Blacksburg, Virginia, pp. 1-169.

* cited by examiner

| Word | 1 | 2 | ... 10 | subframe |
|---|---|---|---|---|
| | TLM | HOW | ephemeris (time parameters) | 1 |
| | TLM | HOW | ephemeris (position parameters) | 2 |
| | TLM | HOW | ephemeris (position parameters) | 3 |
| | TLM | HOW | almanac | 4 |
| | TLM | HOW | almanac | 5 |

30 secs

FIG. 3

METHOD AND APPARATUS FOR WEAK DATA FRAME SYNC IN A POSITIONING SYSTEM

CROSS-REFERENCE TO RELATED APPLICATIONS

This application is a continuation of U.S. patent application Ser. No. 12/277,044 filed Nov. 24, 2008, which is hereby incorporated by reference in its entirety.

FIELD OF THE INVENTION

The present invention is related to location positioning systems, and more particularly, to a method and apparatus of synchronizing to data frames in a satellite positioning system signal such as a GPS signal.

BACKGROUND OF THE INVENTION

With the development of radio and space technologies, several satellites based navigation systems (i.e. satellite positioning system or "SPS") have already been built and more will be in use in the near future. SPS receivers, such as, for example, receivers using the Global Positioning System ("GPS"), also known as NAVSTAR, have become commonplace. Other examples of SPS systems include but are not limited to the United States ("U.S.") Navy Navigation Satellite System ("NNSS") (also known as TRANSIT), LORAN, Shoran, Decca, TACAN, NAVSTAR, the Russian counterpart to NAVSTAR known as the Global Navigation Satellite System ("GLONASS") and any future Western European SPS such as the proposed "Galileo" program. As an example, the U.S. NAVSTAR GPS system is described in GPS Theory and Practice, Fifth ed., revised edition by Hofmann-Wellenhof, Lichtenegger and Collins, Springer-Verlag Wien New York, 2001, which is fully incorporated herein by reference.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver typically has to acquire and lock onto at least four satellite signals in order to derive the position and time. Usually, a GPS receiver has many parallel channels with each channel receiving signals from one visible GPS satellite. The acquisition of the satellite signals involves a two-dimensional search of carrier frequency and the pseudo-random number (PRN) code phase. Each satellite transmits signals using a unique 1023-chip long PRN code, which repeats every millisecond. The receiver locally generates a replica carrier to wipe off residue carrier frequency and a replica PRN code sequence to correlate with the digitized received satellite signal sequence. During the acquisition stage, the code phase search step is a half-chip for most navigational satellite signal receivers. Thus the full search range of code phase includes 2046 candidate code phases spaced by a half-chip interval. The carrier frequency search range depends upon the Doppler frequency due to relative motion between the satellite and the receiver. Additional frequency variation may result from local oscillator instability.

The signals from the navigational satellites are modulated with navigational data at 50 bits/second (i.e. 1 bit/20 msec). This navigational data consists of ephemeris, almanac, time information, clock and other correction coefficients. This data stream is formatted as sub-frames, frames and super-frames. A sub-frame consists of 300 bits of data and is transmitted for 6 seconds. In this sub-frame a group of 30 bits forms a word with the last six bits being the parity check bits. As a result, a sub-frame consists of 10 words. A frame of data consists of five sub-frames transmitted over 30 seconds. A super-frame consists of 25 frames sequentially transmitted over 12.5 minutes.

The first word of a sub-frame is always the same and is known as TLM word and first eight bits of this TLM word are preamble bits used for frame synchronization. A Barker sequence is used as the preamble because of its excellent correlation properties. The other bits of this first word contains telemetry bits and is not used in the position computation. The second word of any frame is the HOW (Hand Over Word) word and consists of TOW (Time Of Week), sub-frame ID, synchronization flag and parity with the last two bits of parity always being '0's. These two '0's help in identifying the correct polarity of the navigation data bits. The words 3 to 10 of the first sub-frame contains clock correction coefficients and satellite quality indicators. The 3 to 10 words of the sub-frames 2 and 3 contain ephemeris. These ephemeris are used to precisely determine the position of the GPS satellites. These ephemeris are uploaded every two hours and are valid for four hours to six hours. The 3 to 10 words of the sub-frame 4 contain ionosphere and UTC time corrections and almanac of satellites 25 to 32. These almanacs are similar to the ephemeris but give a less accurate position of the satellites and are valid for six days. The 3 to 10 words of the sub-frame 5 contain only the almanacs of different satellites in different frames. The super frame contains twenty five consecutive frames. While the contents of the sub-frames 1, 2 and 3 repeat in every frame of a superframe except the TOW and occasional change of ephemeris every two hours. Thus the ephemeris of a particular signal from a satellite contains only the ephemeris of that satellite repeating in every sub-frame. However, almanacs of different satellites are broadcast in-turn in different frames of the navigation data signal of a given satellite. Thus the 25 frames transmit the almanac of all the 24 satellites in the sub-frame 5. Any additional spare satellite almanac is included in the sub-frame 4. The almanacs and ephemeris are used in the computation of the position of the satellites at a given time.

Accordingly, it is clear from the foregoing that the process of locking onto and synchronizing to signals from positioning system satellites, and particularly to being able to extracting meaningful data from such signals, is an important process before determining position and navigating using such signals can begin.

One problem that often makes synchronization difficult and time consuming is when signals from satellites are weak. More particularly, the received signal is characterized by the carrier to noise density ratio $C/N_0$ having units of dB-Hz (sometimes also referred to as CNO). A weaker signal has a lower value of $C/N_0$. At low values of $C/N_0$ there are difficulties in the synchronizations of carrier and frame. Synchronization of code and bit can be maintained down to $C/N_0$ values of about 20 dB-Hz. (All the $C/N_0$ values stated here correspond to the received signal at the output to the correlator.) Synchronization of the carrier phases can be maintained only up to $C/N_0$ values of about 30 dB-Hz by a phase lock loop (PLL). There is a way out for lower values of $C/N_0$. Instead of maintaining synchronization of carrier phases synchronization of carrier frequencies can be maintained down to $C/N_0$ values of lower than 15 dB-Hz by an automatic frequency control (AFC) loop. Data demodulation is then done by differential techniques using both the in-phase (I) and quadrature-phase (Q) samples. However, successful data demodulation can only be done down to $C/N_0$ values of about 26 dB-Hz.

For lower values of $C/N_0$ (i.e. weak signals), data demodulation is unreliable and so some techniques have been developed to perform frame synchronization by correlating received signals with known bits in the TLM word of each subframe (e.g. the 8-bit preamble). These techniques can permit frame synchronization to be achieved down to about 21 dB-Hz. However, they are time consuming because the TLM word only occurs every 6 seconds at the beginning of each sub-frame, and successful correlation often requires multiple iterations of these words.

Because conventional synchronization schemes were sometimes time-consuming, an approach called "Sync Free Nav" has sometimes been used. However, this approach typically requires acquiring and tracking signals from five satellites, which is not always possible. Moreover, using sync free nav sometimes leads to a decrease in initial position performance because sync free nav can have a time offset that leads to position error due to satellite motion.

Accordingly, a method and apparatus for quickly and effectively synchronizing to signals from positioning system satellites remains desirable, whether or not sync free nav is also used. Put another way, a need remains for frame sync methods that can operate successfully with very weak GPS signals ($\leq$15 dB-Hz), and also fast enough (time to frame sync) that standards performance (e.g. 3GPP) and user experience are maintained or improved in the no sync-free nav case.

SUMMARY OF THE INVENTION

The present invention is related to location positioning systems, and more particularly, to a method and apparatus of synchronizing to data frames in a positioning system signal. According to one aspect, the invention speeds up the frame synchronization process by computing a frame synchronization metric for each satellite and then combining together the metrics for all tracked satellites together, after compensating for respective signal transit times. Then the invention makes a frame sync decision on the combined satellite metric. In embodiments, an optimal combining algorithm is used based on CNO of each satellite. According to further aspects, the invention further or alternatively speeds up the frame synchronization process by predicting many bits in the subframe so that more bits are known in addition to the 8-bit preamble. For example, the invention recognizes that many bits in a subframe rarely change or don't change very often. Moreover, the invention uses old ephemeris to predict new ephemeris parameters. These parameters are translated into predicted bits in the signal. Still further, old ephemeris can be used to predict almanac parameters, and the almanac can be used to predict ephemeris parameters.

In furtherance of the above and other aspects, a method for synchronizing to one or more signals in a positioning system according to some embodiments of the invention includes determining respective first correlation values at a plurality of time offsets for a first one of the signals, determining respective second correlation values at the plurality of time offsets for a second one of the signals, time aligning the first and second signals, combining the determined first and second correlation values at the plurality of time offsets after time alignment, identifying a peak combined correlation value at one of the plurality of time offsets, and determining whether the peak combined correlation value corresponds to successful synchronization.

In additional furtherance of the above and other aspects, a method for synchronizing to one or more signals in a positioning system according to embodiments of the invention include synchronizing to a common data frame interval in the signals, including: identifying a combined peak correlation value at one of a plurality of aligned time offsets in two or more of the signals, and comparing the combined peak correlation value to a threshold of success.

In yet additional furtherance of the above and other aspects, a method for synchronizing to one or more signals in a GPS positioning system includes predicting a plurality of bits in addition to a recurring 8-bit preamble of a sub-frame in the one or more signals; and synchronizing to a common data frame interval in the signals, including: using the plurality of bits to form correlation values at a plurality of time offsets in the one or more signals, identifying a peak correlation value at one of a plurality of time offsets in the one or more signals, and comparing the combined peak correlation value to a threshold of success.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 3 is a diagram illustrating data frames in a GPS positioning system example of the present invention;

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Figure 1:
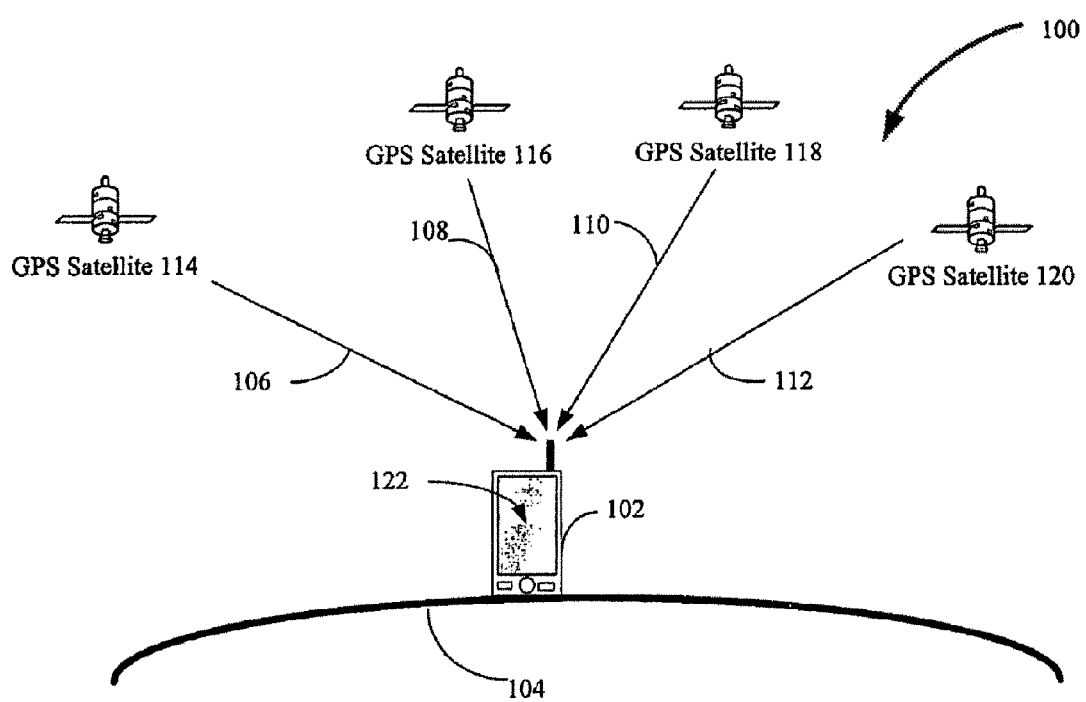
FIG. 1 is a block diagram of an example implementation of principles of the invention.

FIG. 1 illustrates an example implementation of embodiments of the invention. As shown in FIG. 1, GPS satellites (i.e. SVs) 114, 116, 118 and 120 broadcast signals 106, 108, 110 and 112, respectively, that are received by receiver 122 in handset 102, which is located at a user position somewhere relatively near the surface 104 of earth.

Handset 102 can be a personal navigation device (PND, e.g. from Garmin, TomTom, etc.) or it can be a cell or other type of telephone with built-in GPS functionality, or any GPS device embedded in tracking applications (e.g. automotive tracking from Trimble, package or fleet management tracking from FedEx, child locator tracking applications etc).

Receiver 122 can be implemented using software and/or hardware, including GPS chipsets such as SiRFstarIII GSD3tw or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the frame synchronization techniques of the present invention after being taught by the present specification.

Signals 106, 108, 110 and 112 are well-known GPS signals in which three binary codes shift the satellite's transmitted L1 and/or L2 frequency carrier phase. Of particular interest, the C/A Code (Coarse Acquisition) modulates the L1 carrier phase. The C/A code is a repeating 1 MHz Pseudo Random Noise (PRN) Code. This noise-like code modulates the L1 carrier signal, "spreading" the spectrum over a 1 MHz bandwidth. The C/A code repeats every 1023 bits (one millisecond). There is a different C/A code PRN for each SV. GPS satellites are often identified by their PRN number, the unique identifier for each pseudo-random-noise code. The C/A code that modulates the L1 carrier is the basis for the civil uses of GPS.

Receiver 122 produces the C/A code sequence for a specific SV with some form of a C/A code generator. Modern receivers usually store a complete set of pre-computed C/A code chips in memory, but a hardware shift register implementation can also be used. The C/A code generator produces a different 1023 chip sequence for each phase tap setting. In a shift register implementation the code chips are shifted in time by slewing the clock that controls the shift registers. In a memory lookup scheme the required code chips are retrieved from memory. The C/A code generator repeats the same 1023-chip PRN-code sequence every millisecond. PRN codes are defined for up to 1023 satellite identification numbers (37 are defined for satellite constellation use in the ICD but system modernization may use more). The receiver slides a replica of the code in time until there is correlation with the SV code.

Figure 2:
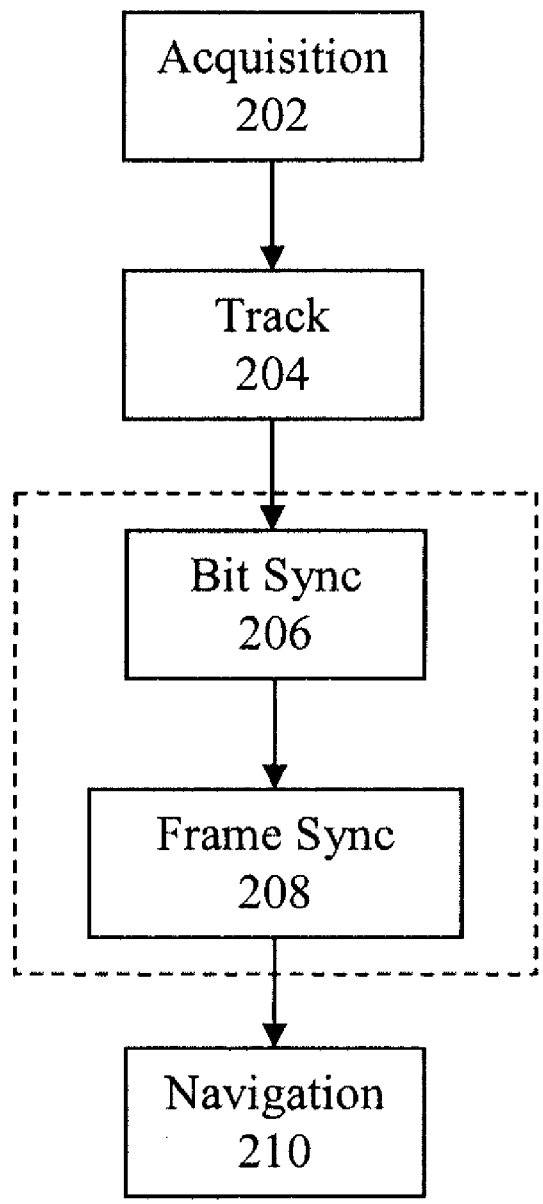
FIG. 2 is a block diagram of a typical receiver sequence in which the present invention can be included.

As is known, signals from at least four SVs are usually needed before receiver 122 can provide a 3-dimensional navigation solution (only three satellites are required for a 2-dimensional navigation solution, e.g. by using known height). Accordingly, as shown in FIG. 2, receiver 122 typically enters a predetermined sequence to acquire and extract the required data from each of signals 106, 108, 110 and 112. In a first step, acquisition 202, receiver 122 acquires signals 106, 108, 110 and 112 by correlating the unique C/A code corresponding to SVs 114, 116, 118 and 120 with received RF energy at the antenna of handset 102 and determining that these received signals have sufficient strength (e.g. carrier to noise ratio $C/N_0$) to use in subsequent processing. In a next step, track 204, the receiver 112 locks onto the C/A code for each acquired SV, which repeats every 1 msec. In step 206, receiver 112 synchronizes to the data bit in each signal 106, 108, 110 and 112, which occurs once over 20 msec. Then in step 208, receiver 112 determines the frame boundary of the received bits in signals 106, 108, 110 and 112. At this point in step 210 navigation can begin, for example by trilateration techniques known to those skilled in the art.

It should be noted from FIG. 2 that frame synchronization step 208 is omitted (and sometimes also step 206) in some applications such as sync free nav (although bit synchronization 206 is still desired for optimal operation as tracking loops need to integrate across an exact data bit to maximize signal energy applied to tracking). Accordingly, by performing frame synchronization step 208 in the manner that will be described in more detail herein, the present invention is distinctive and an improvement over such "Synch Free" approaches. Moreover, while the present disclosure is related to embodiments of determining frame synchronization 208, other conventional and novel techniques can be performed to perform acquisition 202, track 204, data bit synchronization 206 (see, e.g., co-pending U.S. application Ser. No. 12/276, 987 filed Nov. 24, 2008, incorporated by reference herein) and navigation 210, but details thereof will be omitted here for sake of clarity of the invention.

With reference to FIG. 2, after data bit synchronization has been achieved, the receiver tries to synchronize to the frame in the signals from each SV. More particularly, after synchronization 206, the receiver is locked to the data bit transitions in the signal for each SV, which repeats every 20 msec. However, since the data bit can be any bit in any subframe, which spans over 6 sec, the receiver still needs to resolve in what portion of the frame each data bit occurs and set the receiver time accurately.

A conventional frame sync process processes each SV being tracked separately and typically needs at least two complete subframes (i.e. at least two multiples of 6 seconds) to find the repeating 8-bit preamble that begins each subframe, and even longer in weak signal levels (e.g. 20 dB-Hz or 15 db-Hz or lower).

More particularly, as discussed above and as shown in FIG. 3, a GPS data frame includes five subframes, and each subframe includes 10 30-bit words. The first word in each subframe is called a TLM word and includes an 8-bit preamble that is always the same. However, as further mentioned above, the multiple subframes required by the conventional process to find this repeating preamble is too long for many applications.

According to some aspects of the invention, synchronization problems with weak signals are noted and a scheme for time aided frame synchronization is provided. For example, according to some aspects, the invention speeds up the frame synchronization process by predicting or assuming the values of many bits in the subframe so that more bits are searched in addition to the 8-bit preamble. For example, the invention recognizes that many bits in a subframe rarely change or do not change very often. According to still further aspects, the invention uses old ephemeris used to predict new ephemeris parameters. These parameters are translated into predicted bits in the signal. Still further, old ephemeris can be used to predict almanac parameters, and the almanac can be used to predict ephemeris parameters. According to other aspects, the invention further or alternatively speeds up the frame synchronization process by computing a frame synchronization metric for each satellite and then combining together the metrics for all tracked satellites together, after compensating for respective signal transit times. Then the invention makes a frame sync decision on the combined satellite metric. In embodiments, an optimal combining algorithm is used based on CNO of each satellite.

Aspects of the invention for determining and using more than the 8-bit preamble of the TLM word for performing frame synchronization will now be described in more detail.

In embodiments, the present invention recognizes that additional bits in the TLM and HOW word can be determined with some a priori information on time. This information can be available if the GPS receiver's clock is sufficiently accurate and the elapsed time since previous frame sync is not large. Alternatively this time information can be obtained from an external source over a separate communication link (e.g. a network aided or coarse-aided case). If the time information is available, a 17 bit pattern of the Z count (related to time-of-week, TOW) is known. This pattern combined with the bit pattern of preamble (8 bits), subframe number (3 bits) and zero bits (2 bits) give a pattern of a total of 30 bits contained in the TLM and HOW words (having a total of 60 bits combined) of the navigation message (see ICD-GPS-200 for details of this bit pattern).

As will be explained in more detail below, a much greater number than 30 bits per subframe can be assumed or predicted in other embodiments of the invention, and can lead to even faster synchronization in even weaker signal settings. However, the following description using just 30 bits as an example is provided for sake of explaining some example principles of the present invention.

Depending on the time uncertainty, a time window of appropriate size (in number of bits) and starting point (in real time) can be searched for the known 30 bit pattern. Since data demodulation is not reliable, this search has to be made without explicit data demodulation. One such search scheme is to appropriately correlate the known bit pattern of 30 bits with the values I and Q integrated over the bit boundaries. If the time uncertainty is large then the window size is also large and a search for the known bit pattern can not be done reliably; hence the limit on the time uncertainty (i.e. the maximum time window required in this case is 6 seconds because the TLM/HOW words repeat every 6 seconds). The search, if successfully completed, achieves frame synchronization and the satellite transmit time can be unambiguously obtained. Since data demodulation is not done explicitly the navigation message is not obtained. However, the navigation message may either be available from previous track of the GPS satellite signal or can be obtained (along with estimated time information) from an external source over a separate communication channel. Ultimately, the transmit time and the navigation message, from a minimum of four satellites, lead to the computation of the receiver position.

One example technique of determining a time-related pattern to search will now be described. Let T be the time by the receiver clock at which bit sync holds good but frame sync is yet to be completed. The time T is in the number of seconds since the beginning of the latest week. This time is compensated by a typical range equivalent of time, say, 0.07 seconds, so T:=T−0.07. Find time $T_H$=6*ceil(T/6), where the function ceil rounds the given number towards plus infinity. Adjust $T_H$ for week roll over if any, i.e., if $T_H$=604800, reset $T_H$ to 0. $T_H$ is thus the time nearest in future of T at which a new subframe begins with TLM and HOW words.

As mentioned above, one time-related pattern in every subframe is the Z count. The Z count is in the HOW word of every subframe. The expected Z count is Z=($T_H$/6)+1. As with T, Z is adjusted for week roll over if any, i.e., if Z=100800, Z=0. As shown in FIG. 3, each subframe contains one HOW word and the subframe number increases from 1 to 5 and then starts from 1 again. If Z=1 is contained in the subframe number 1 then the subframe number, SNO for any Z (except Z=0 for which SNO=5) is thus given by SNO=Z−floor((Z−1)/5)*5, where the function floor rounds the given number towards minus infinity.

As further mentioned above, along with determining Z count and subframe number, embodiments of the invention determines a time window for performing a search. Let the time uncertainty of the receiver clock be $T_U$ seconds. There are two extreme cases to be considered with regard to the search for a known 30 bit pattern starting with $T_H$. In the first case, the true time is $T_H$ but the GPS receiver time indicates $T_H$−$T_U$. So when the indicated time becomes $T_H$ the known 30 bit pattern has already moved forward and was missed. In the second case, the true time is $T_H$ but the GPS receiver time indicates $T_H$+$T_U$. So when the indicated time is $T_H$ the known 30 bit pattern is yet to come.

Suppose that the start for the search for the known 30 bit pattern in TLM and HOW words begins at $T_H$−$T_U$ as per the GPS receiver time. (It is clear that this is possible only if $T_H$−$T_U$>T. If not, then change $T_H$ to $T_H$+6, adjust it for week roll over if required and find new Z and SNO for the changed $T_H$.) If the real case is the first case above then the pattern will be found in the first 60 bits. If the real case is the second case above the true time is $T_H$−2$T_U$ and the pattern will be found in the 60 bits which come after 50*2$T_U$=100$T_U$ bits (1 second corresponds to 50 bits). From the above it is clear that search for the known pattern can be made in a window beginning at $T_H$−$T_U$ and having size of 100$T_U$+60 bits. The window size will be large for large $T_U$. For reliable detection of the known pattern this size should be limited to less than 360 bits. If the window size is 360 bits then it can contain two Z counts differing by a small change in the bit pattern (the two 17 bit Z counts may differ only in their least significant bits) and so detection of the desired Z count along with preamble, subframe and zero bits may not be reliable. This limit on the window size gives a limit on $T_U$ to be 3 seconds. With some tightening for the sake of keeping margin, the limit on $T_U$ is specified to be 2 seconds, which means the search window is 260 bits. It is to be noted that the verification of the assumption that the uncertainty $T_U$ in the approximate time is indeed within ±2 seconds is to be carried out separately and if the assumption is not satisfied then frame sync processing should not be started.

An example embodiment for performing the actual search for the bit pattern using correlation will now be described. This correlation scheme can use the search window that is formed as described above, or other alternatives as will become apparent from the following descriptions.

In this example, a correlation value $C_k$ is calculated at every time offset k (k is in units of 20 msec) and compared to a threshold. In general, the correlation value is determined as a normalized sum of dot product terms using the following equation:

$$C_k = \frac{\sum_{k+n} DP_{20\,msec\,sk+n} * B_n}{\sum_{k+n} |DP_{20\,msec\,sk+n}|}$$

where $DP_{20msecs}$ is a dot product between two adjacent 20 msec periods j and j−1 formed as $$DP_{20msecsj} = I_j * I_{j-1} + Q_j * Q_{j-1}$$

and where $B_n$ are the known data bit transitions (e.g. the known 30 bit pattern) in the search window. It should be apparent that known data bit transitions can be readily obtained from known data bits, and inversions are allowed. It should be further apparent that the bit transitions need not be at adjacent 20 msec offsets.

An aspect of this correlation calculation scheme is that it is resistant to phase shift (or frequency drift, since the receiver is not necessarily phase locked at low CNO). Another aspect of this scheme is that the decision process speeds up the decision. More particularly, if correlation sums are formed across a given uncertainty period (e.g. the number of 20 msec offsets k used for the sums spans the time uncertainty of 2 seconds, or 260 bits as discussed above) then the correct correlation is guaranteed to be in the set of sums $C_k$. Therefore the receiver selects the maximum $C_k$ value as the correct one initially (i.e. it does not rely on receiving two sets of correlations 6 seconds apart (TLM/HOW) as this slows the process down too much).

In embodiments, the receiver also requires that the selected $C_k$ must be greater than a threshold $T_{threshold}$, to ensure that the receiver has enough transition signal power to make a decision (essentially the maximum $C_k > T_{threshold}$ must be satisfied). $T_{threshold}$ can be derived via offline simulation based on a desired probability of success (e.g. a desired value of Pfa or Pd) and programmed into the receiver. It should be apparent that one or more thresholds can be stored, for example in a table, for varying conditions or schemes, and then the appropriate threshold dynamically looked up by the receiver depending on the circumstances. For example, there can be several different thresholds for respective numbers of satellites being used in the threshold comparison (as will be described in more detail below). Many other alternatives are possible.

As mentioned above, according to certain additional or alternative aspects, the present invention recognizes that it is possible to speed up the synchronization process, especially for weak signals, by combining the individual SV frame synchronization results together.

Figure 4:
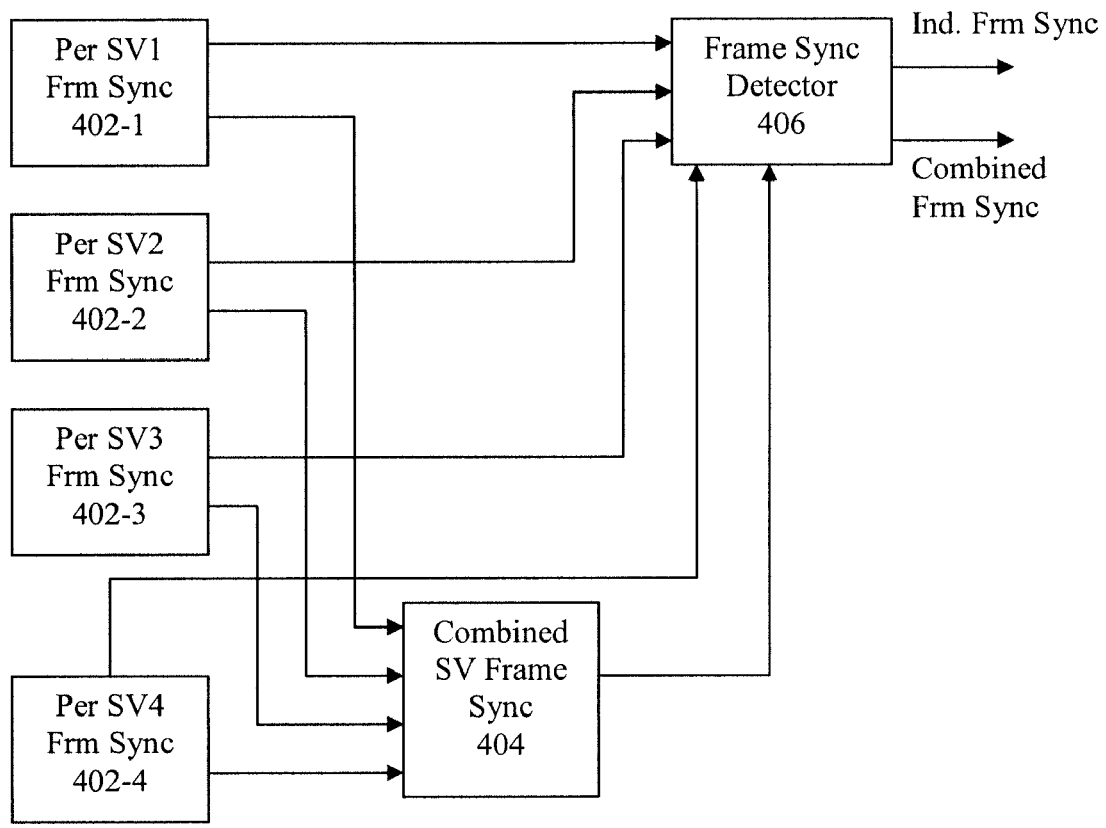
FIG. 4 is a block diagram of a weak frame synchronizer according to aspects of the invention.

In general, as shown in FIG. 4, the weak data frame synchronizer 400 according to embodiments of the invention includes individual SV frame sync modules 402-1 to 402-4, a combined SV frame sync module 404, and a frame sync detector 406. The detector 406 will detect when the combined frame sync triggers first, and the individual frame sync modules will continue to improve results but are not required for initial navigation.

In embodiments, the individual SV bit sync modules 402-1 to 402-4 run a frame sync algorithm as described above. Meanwhile, the combined frame sync module 404 combines the correlations across satellites for each of the 20 msec correlations. The combined multi-satellite correlation values are then used to make frame sync decisions.

In embodiments to be described in more detail below, the combined frame sync module 404 uses information from all tracked SVs (typically four or more) to perform combined frame sync computations. However, other embodiments are possible. For example, module 404 can use an optimal combining algorithm based on each satellite's CNO if they are not within a given threshold (e.g. about 3 dB of each other). For example, if two satellites have CNO=21 dB-Hz and two more have CNO=15 dB-Hz then the best combination is based on the two satellites at 21 dB-Hz, and the two at 15 dB-Hz would not be used in the multiple satellite combining bit sync algorithm. Other combinations are also possible. For example, a single high CNO satellite can be used to set bit sync for all satellites in the coarse aided case. In any event, module 404 forms combined frame sync correlations at all 20 possible msec offsets.

It should be noted that according to aspects of the invention, the frame synch algorithm herein can achieve synchronization with only four SVs as shown in FIG. 4, rather than five or more as is required in some other applications. However, this is not necessary, and the invention can also be practiced with additional SVs.

Figure 5:
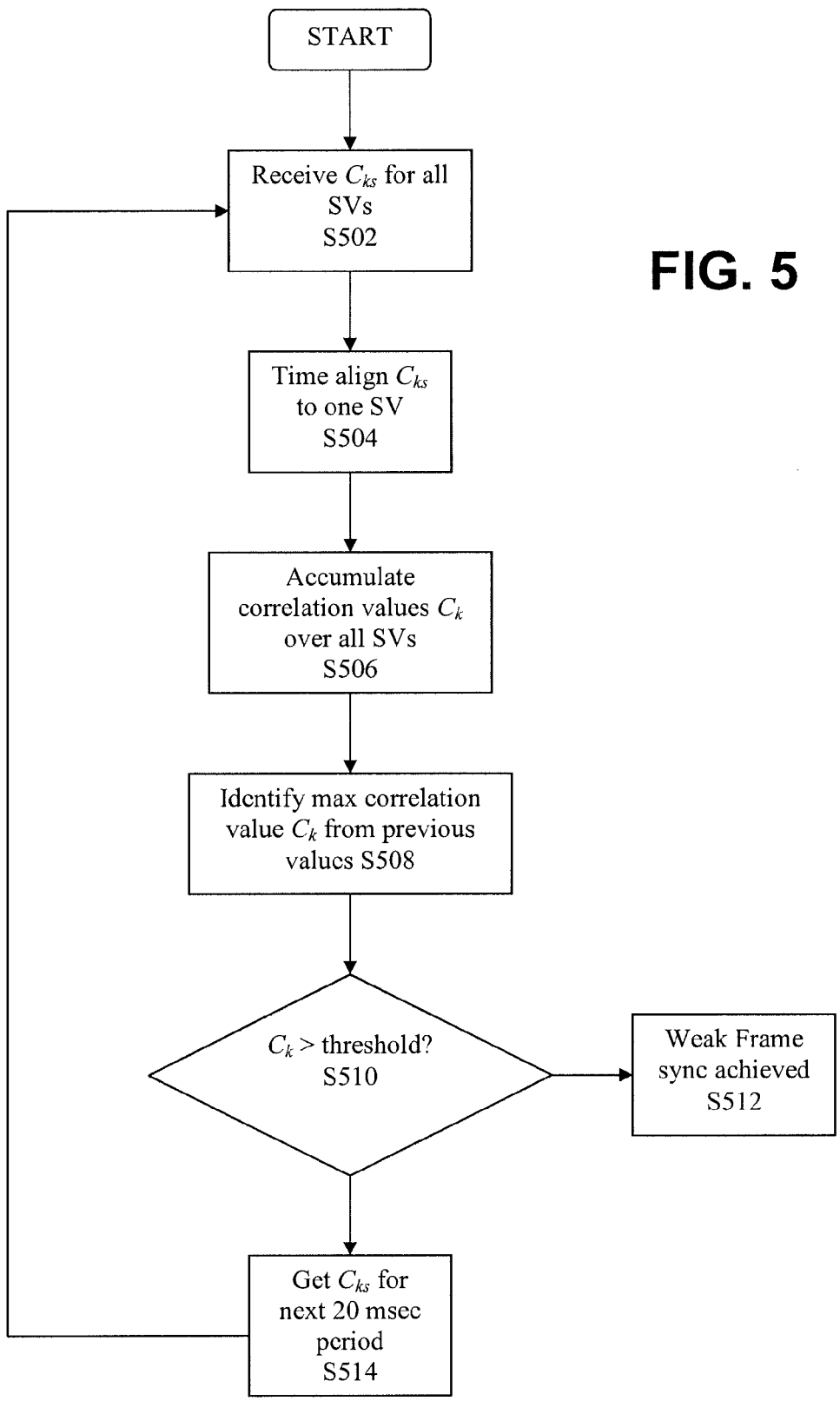
FIG. 5 is a flowchart illustrating an example combined frame sync methodology that can be performed in accordance with aspects of the invention.

An example detection method of combined SV frame sync module 404 is illustrated in FIG. 5.

Every 20 msec, each of the individual SV frame sync modules 402 (s=1, 2, 3, 4) provides a value of $C_{ks}$ as follows:

$$C_{ks} = \frac{\sum_{k+n} DP_{20\,msec\,sk+n} * B_n}{\sum_{k+n} |DP_{20\,msec\,sk+n}|}$$

where $DP_{20msecs}$ is a dot product between adjacent I and Q values received for each individual SV and $B_n$ are known data bit transitions as described above Module 404 receives a set s of correlation values $C_{ks}$ for a given 20 msec period from modules 402 in step S502.

In step S504, before summing the correlation values together, module 404 aligns the correlation values from the different satellites in time by adjusting for each satellite's signal transit time. The transit time is derived from the difference between the satellite's position (e.g. known via ephemeris information) and the user position (e.g. known from a coarse-aided system or a hot start condition).

More particularly, the present invention recognizes, inter alia, that a coarse-aided system (e.g. GSM network-aided applications) provides user position (i.e. $X_u$, $Y_u$, $Z_u$) within about 30 km, and also provides ephemeris for all satellites (i.e. $X_s$, $Y_s$, $Z_s$). There is also a ±2 second time uncertainty, and so bit sync and frame sync are then required to resolve time to better than 1 msec in the non-sync free nav case. Accordingly, pseudo-range PR can be calculated for all satellites s being tracked as:

$$PR_s = SQRT((X_s - X_u)^2 + (Y_s - Y_u)^2 + (Z_s - Z_u)^2) \text{ where } s=1, 2, 3, 4$$

The transit time for each satellite signal is then easily obtained as $T_s = PR_s/c$, where c is the speed of light (about $3 \times 10^8$ msec, or about 300 km/msec). It should be noted that ionospheric effects can be considered separately but are typically not large (<100 meters). Meanwhile, parameters such as Doppler relate to a change in relative position so they are taken into account as satellite position error because it has moved.

The times for each satellite can then be readily aligned in periods of 20 milliseconds, for example from the first satellite SV1 as:

$$\Delta T_2 = (T_2 - T_1)/20 \text{ msec} + \text{remainder}_2$$

$$\Delta T_3 = (T_3 - T_1)/20 \text{ msec} + \text{remainder}_3$$

$$\Delta T_4 = (T_4 - T_1)/20 \text{ msec} + \text{remainder}_4$$

For purposes of aligning the correlation values, only the 20 msec portions of the offset are considered and the remainders can be ignored.

It should be apparent that for a first iteration of step S504, that more than one set of correlation values $C_{ks}$ for each satellite may need to be obtained before alignment occurs for a first set 20 msec time period, due to the differences in transit times for each SV.

In step S506, after time aligning the correlation values, the combined correlation values can be found by summing all the $C_{ks}$ from SVs (s=1 to 4) as:

$$C_k = \Sigma C_{ks}$$

In step S508, this new correlation values are compared with any prior correlation value $C_k$ from prior 20 msec periods.

Similar to the individual SV process described above, in step S508 the maximum correlation value $C_k$ identified from all previous values of $C_k$ in step S510 is compared to a threshold to determine if it is strong enough to be considered a synchronization condition. If so, then the decision is accepted in step S512 and the location of the maximum is determined to correspond to the correct location of the frame boundary. Otherwise, processing continues to step S514, where a new $C_k$ value is received from the individual SVs for the next 20 msec period.

It should be apparent that many processing variations, sequences, additional steps and fewer steps can be performed than those described in FIG. 5. For example, in step S502, the number and identifier of SVs to use in the combination calculation can be determined based on CNO levels. Moreover, steps can be rearranged or reduced, for example performing time alignment between the SVs once, and then using pointers and/or indices to select appropriate $C_{ks}$ values from individual SVs before combining.

Still further, a certain number of combined $C_k$ values can be determined before beginning to identify a maximum value. More particularly, according to some embodiments, a number of $C_k$ values are determined and saved before making a decision ($C_k$ values spanning time uncertainty) provides more reliable results because the correct value is always in the checked data set, whereas if the entire time uncertainty is not spanned, there is a possibility of a false positive. However, in other embodiments, it is not necessary to span the entire time uncertainty before making a decision. Many further changes or alternatives are possible, as will become apparent to those skilled in the art after being taught by the present examples.

Figure 12:
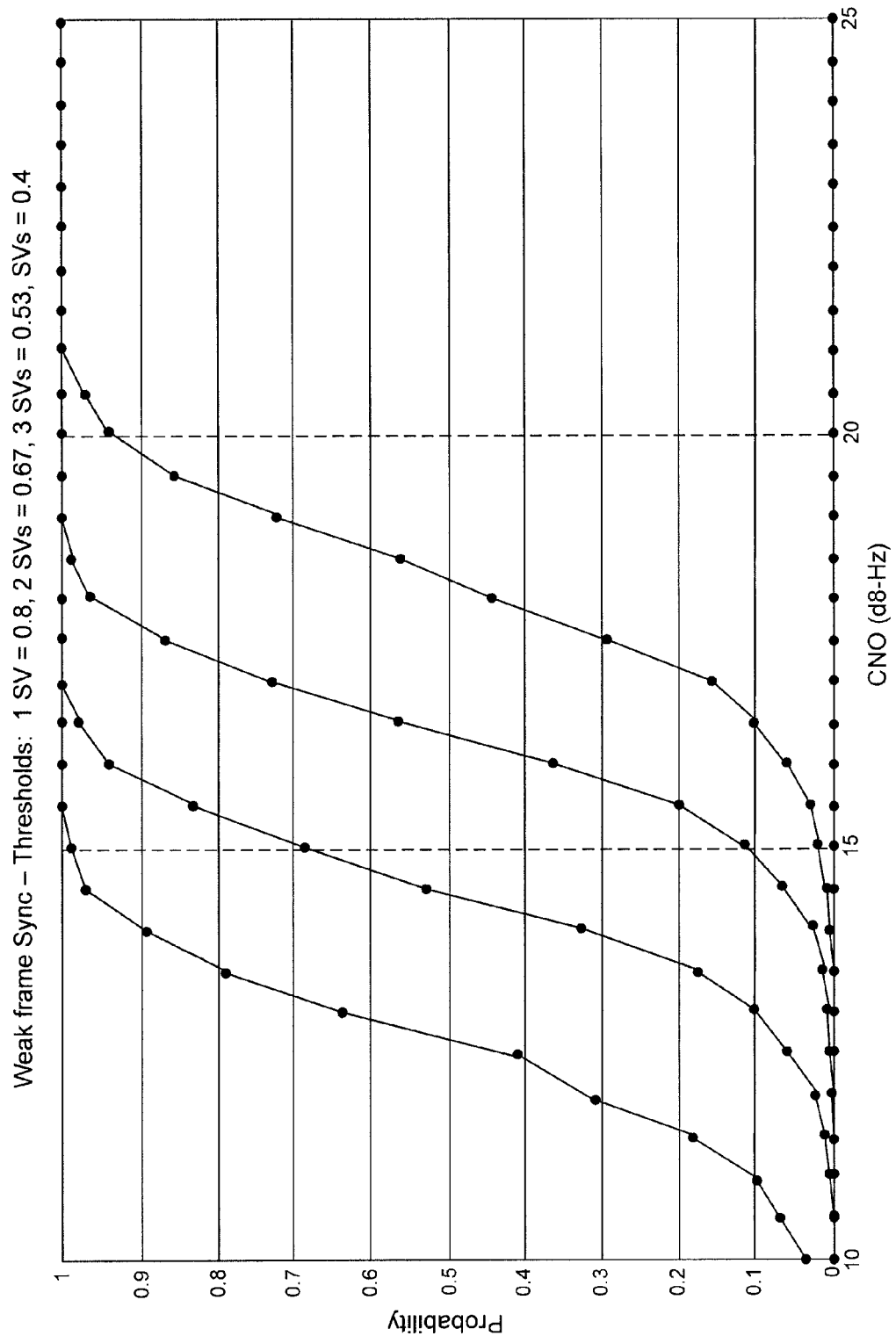
FIG. 12 is a chart showing simulation results of combining frame sync metrics from multiple SVs according to aspects of the invention.

In any event, according to simulation results shown in FIG. 12, combining correlation values from multiple SVs allows the invention to perform frame synchronization under much weaker signal conditions than is possible in the conventional arts. For example, as shown in FIG. 12, a Pd of over 90% can be achieved with combined values from four SVs in weak signal conditions less than 15 db-Hz. FIG. 12 also demonstrates how different thresholds can be used depending on the number of SVs used, and the desired Pd and/or Pfa.

Returning to FIG. 4, and as discussed above, when combined frame sync has been detected by module 404, this is reported to frame sync detector 406, which provides a signal to downstream processing regarding the frame sync so that navigation processing can begin. Meanwhile, further processing can be performed by the per-SV frame sync modules 402 until they respectively determine a data frame sync for the individual SV signals.

As mentioned above, according to certain additional or alternative aspects, the present invention recognizes that it is possible to assume or predict more than just the 30 bits per subframe described above. Three example methods for predicting even more bits per subframe will be described hereinbelow, however the invention is not limited to these examples.

In each of these examples, similar processing such as that described above in connection with FIGS. 4 and 5 can be performed to determine frame synchronization both for individual SVs and for combining SVs together, and those skilled in the art will understand how to adapt the above techniques to situations where more data bits are available for correlation, as will be described in more detail below.

In a first example, the present inventors recognize that virtually all the bits of the TLM and HOW words can be determined in advance, for example based on analyzing historical GPS. This is illustrated in FIG. 6, which shows the fields of the TLM and HOW words.

Figure 6:
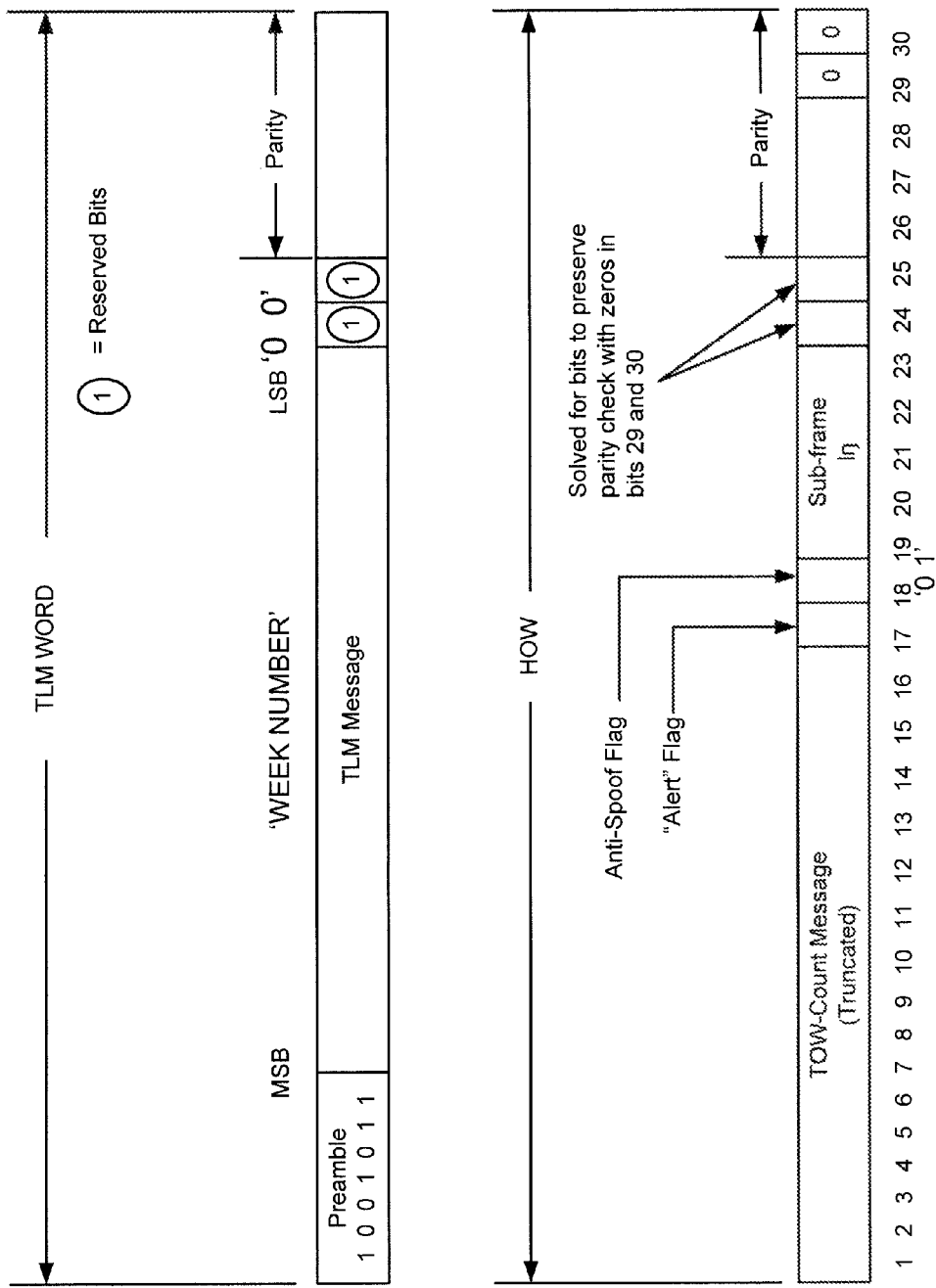
FIG. 6 illustrates bit fields of TLM and HOW words that can be determined for use in frame synchronization according to aspects of the invention.

As illustrated in FIG. 6 and as discussed above, the first 8 bits of the TLM word (i.e. the preamble) is known.

The next bits of the TLM word (i.e. bits 9-22) are typically the Week Number, and so can be readily determined from date information.

The next 2 bits of the TLM word (i.e. bits 23 and 24) are reserved bits, and are typically zero and zero, according to observations of historical data.

The last 6 bits of the TLM word (i.e. bits 25-30) are parity bits and can be computed based on the contents of bits 1-24.

In the HOW word, the first 17 bits are the TOW-Count (i.e. Z count), which are determined as described above.

The next 2 bits (i.e. bits 18 and 19) are known as the Alert Flag and the Anti-Spoof Flag bits, respectively. These are determined to be 0 and 1, respectively by analysis of historical data and knowing the function of these bits. Additionally or alternatively, when the satellites are strong enough (say >26 dB-Hz), the current value of the TLM/HOW bits can be readily decoded, and the receiver's database knowledge of these bits can be updated such that the receiver is resistant to these bits changing over long time periods. So if they change from their historically derived values, the updated values can be incorporated into database to make the receiver future proof.

The next 3 bits (i.e. bits 20-22) of the HOW word are the sub-frame ID, which are determined as described above.

The last 8 bits of the TLM word (i.e. bits 23-30) contain the parity bits (bits 25-30) and two preceding bits. The last 2 bits of the parity (i.e. bits 29 and 30) are known to always be 00 by analysis of historical data. Accordingly, the remaining parity bits and the 2 preceding bits can be computed based on the contents of bits 1-22 and trial and error to maintain the last 2 bits as 0 and 0.

In a next example, additional bits are predicted via orbit prediction.

More particularly, in embodiments of the invention according to this example, old ephemeris is predicted ahead to the current time using the client-based extended ephemeris techniques as described, for example, in U.S. Pat. No. 7,142,157.

The present inventors analyzed ten years of data from 1998 to 2007 taken from daily Rinex files on ftp:://cddis.gsfc.nasa.gov. The ephemeris was predicted ahead by an integer number of days from 1 to 100. If a satellite ever was found to go unhealthy, that data was thrown out from 1 week prior to the event to 1 week after the event. If a satellite ephemeris was missing for a day, it was also treated as unhealthy and that data was also thrown out 1 week prior to 1 week after the missing data. A prediction was never made over an unhealthy event or a missing day event. A prediction was only made and compared if the ephemerides for the start and finish were exactly a multiple of 24 hours apart. The data was thrown out for unhealthy satellites cases to protect against a delta-v (the satellite performing a maneuver) which is unpredictable. These do not happen very often, so it is considered reasonable to ignore that case. For implementation, if a satellite ever goes unhealthy, that event will need to be marked so that it will not be propagated forward till it becomes healthy again.

The 10 year data set was predicted ahead 1 to 100 days and compared to its time match. The data for each prediction was sorted and the Number_of_Samples*0.999 sample was taken for each day for each ephemeris parameter. The error was converted to a bit error and the results were plotted. The inventors noted that most of the ephemeris parameters have roll over effects around zero or around the maximum and minimum values that will mean the value can have 2 sets of values, one being the inverse of the other. The unsigned parameters do not have this issue an include sqrt_A, eccentricity, toe. The analysis showed how close ephemeris values can be predicted. The broadcast bits for a particular value will be inverted if the previous bit's D30 (last parity bit) is set.

Figure 7:
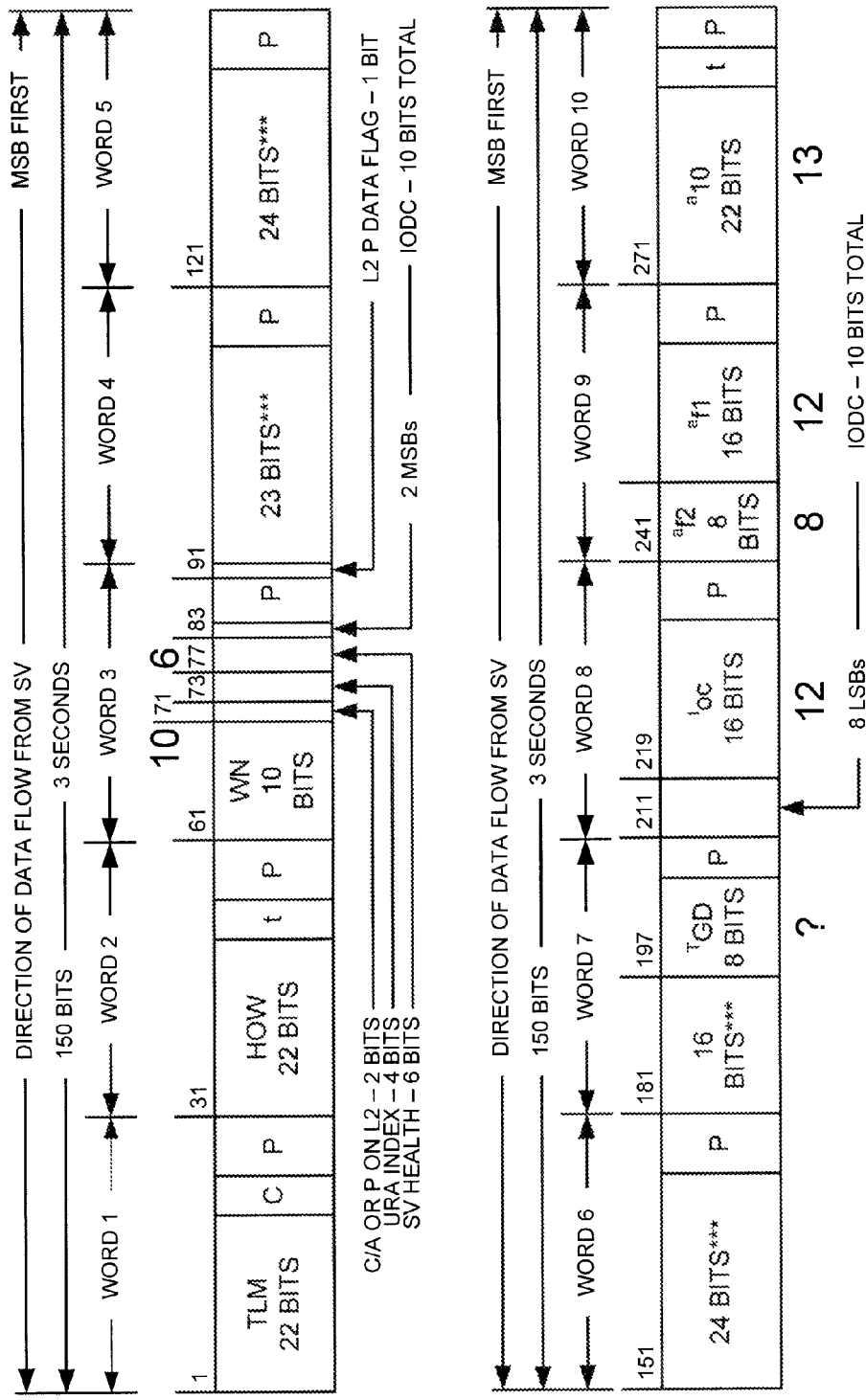
FIGS. 7 to 11 illustrate bit fields of GPS subframes that can be predicted and/or otherwise determined according to aspects of the invention.
Figure 8:
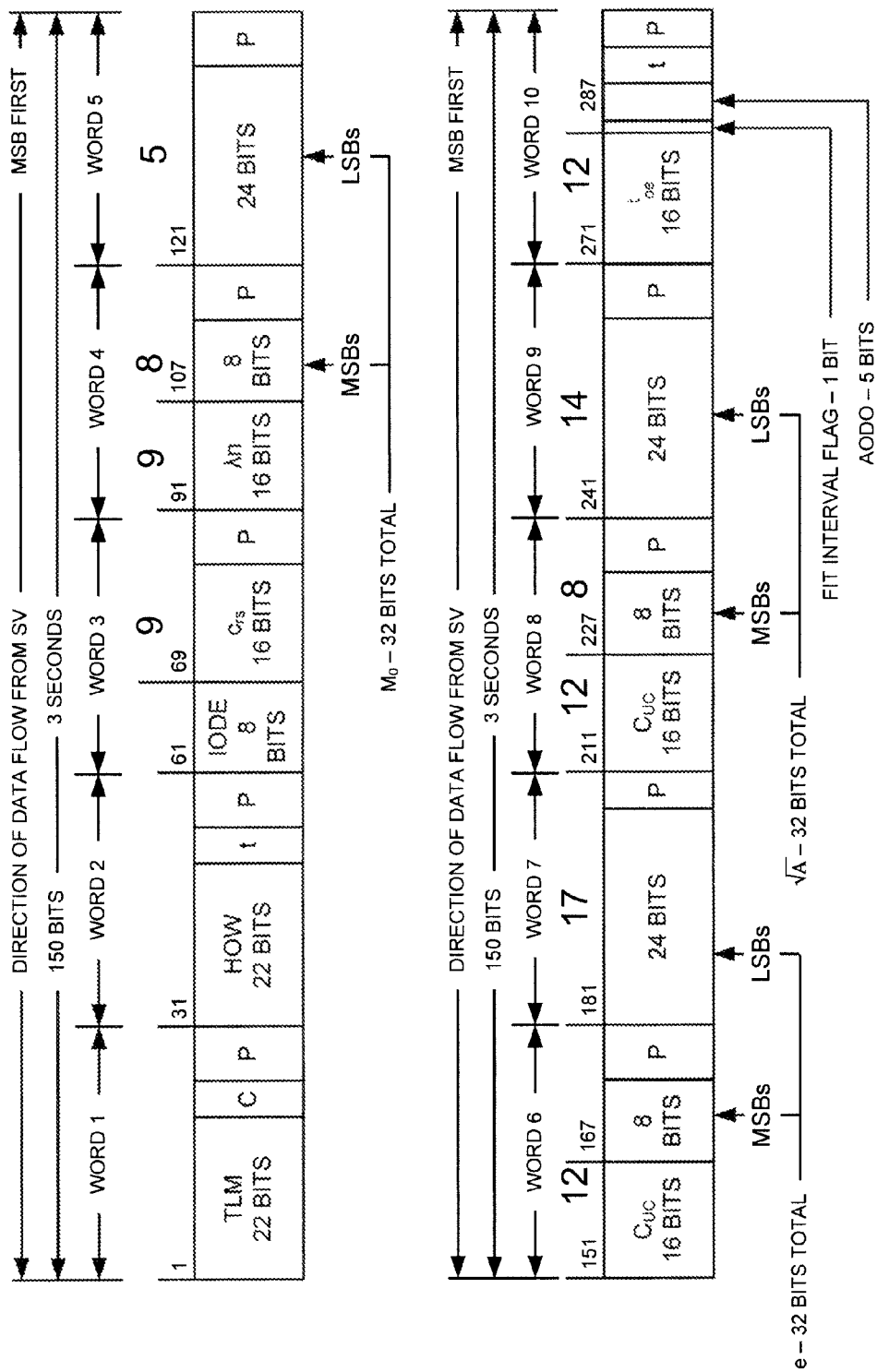
Figure 9:
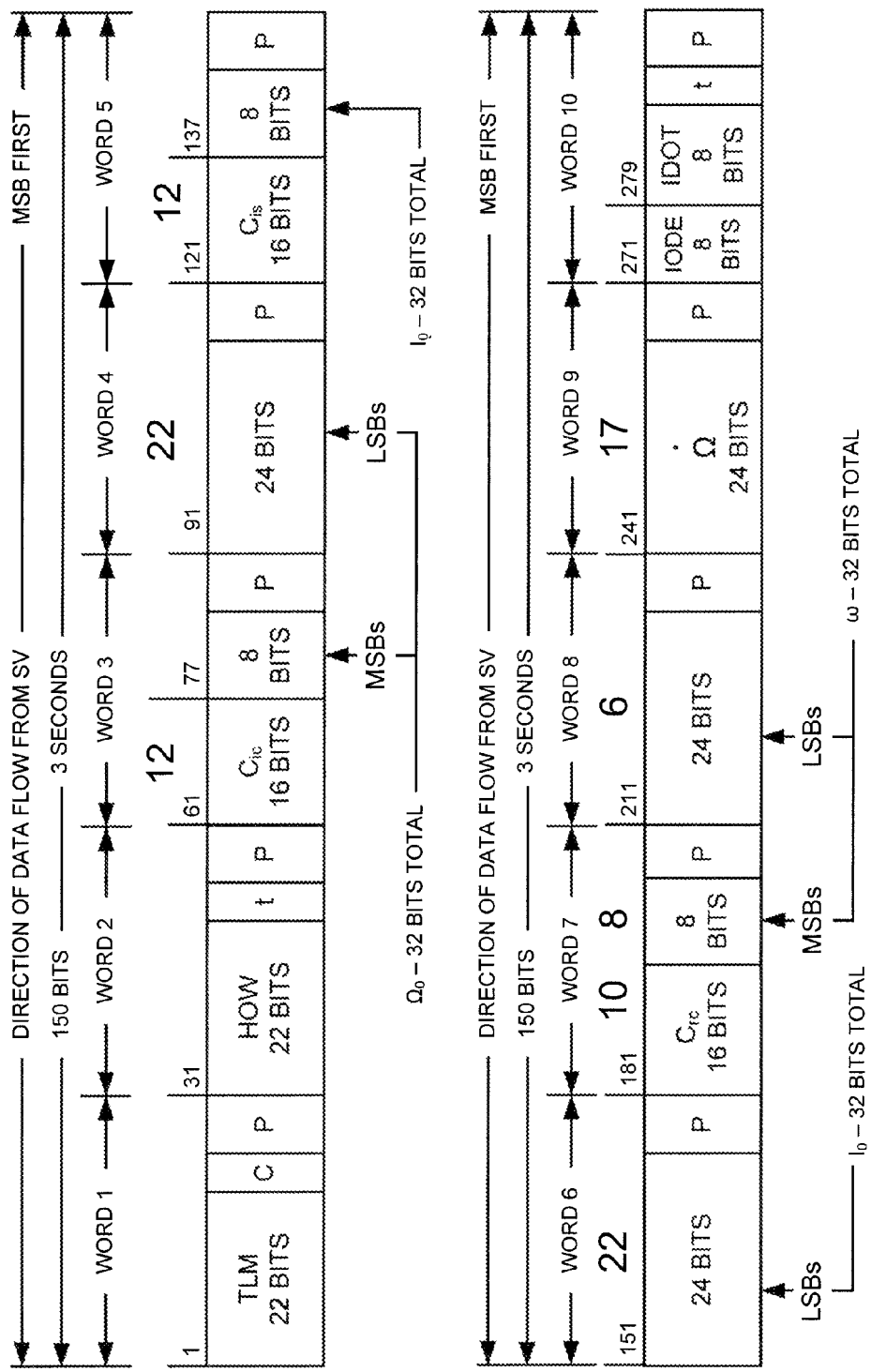

FIGS. 7 to 9 illustrate examples of how additional bits for frame synchronization correlation processing can be predicted using orbit prediction (i.e. extended ephemeris).

FIG. 7 illustrates bits in subframe 1 that can be determined a priori and/or predicted according to embodiments of the invention. As shown in FIG. 7, the first 10 bits of Word 3 of subframe 1 (i.e. bits 61 to 70) are called WN bits. These 10 bits have been determined to be the week number WN from analyzing historical data, and thus is known as long as the time estimate is still known within 2 seconds (which is the case in a GSM example, or if the receiver has been turned on in the last few months).

Word 3 of subframe 1 also contains 6 bits (i.e. bits 77 to 82) which are known as SV health bits. These are assumed to be all zeroes, which is the case when the satellite is healthy, which is fairly safe to assume.

As further shown in FIG. 7, word 7 of subframe 1 includes 8 bits (i.e. bits 197 to 204) known as TGD. These 8 bits are predicted via knowing its value some time in the past (e.g. within last couple of weeks).

Word 8 of subframe 1 includes 16 bits called $t_{OC}$ (i.e. bits 219 to 234). The most significant 12 bits of these 16 bits are determined via ephemeris clock prediction (part of client based ephemeris prediction).

As further shown in FIG. 7, word 9 of subframe 1 includes 8 bits called $a_{f2}$ (i.e. bits 241 to 248). Word 9 of subframe 1 further includes 12 bits called $a_{f1}$ (i.e. bits 249 to 260). These 20 bits are determined to via ephemeris clock prediction (part of client based ephemeris prediction).

As further shown in FIGS. 7-9, in embodiments of the invention, all the following bits are also predicted via client based ephemeris. Those skilled in the GPS arts are familiar with the meaning of the identified fields and bits:

Word 9 of subframe 1 includes 22 bits called $a_{f0}$ (i.e. bits 271 to 292). The most significant 13 bits of these 22 bits are predicted As shown in FIG. 8, 16 bits of Word 3 of subframe 2 (i.e. bits 69 to 84) are called $C_{rs}$ bits. The most significant 9 bits of these 16 bits are predicted Word 4 of subframe 2 contains 16 bits (i.e. bits 91 to 106) which are known as Δn bits. The most significant 9 bits of these 16 bits are predicted.

As further shown in FIG. 8, word 4 of subframe 2 also includes 8 bits (i.e. bits 107 to 114) which are the most significant bits of $M_0$. These 8 bits are predicted.

As further shown in FIG. 8, word 5 of subframe 2 includes 24 bits (i.e. bits 121 to 144) which are the least significant bits of $M_0$. The most significant 5 bits of these 24 bits are predicted.

Word 6 of subframe 2 includes 16 bits called $C_{UC}$ (i.e. bits 151 to 166). The most significant 12 bits of these 16 bits are predicted.

As further shown in FIG. 8, word 7 of subframe 2 includes 24 bits which are the least significant bits of a field called e (i.e. bits 181 to 204). The most significant 17 bits of these 24 bits are predicted.

Word 8 of subframe 2 includes 16 bits called $C_{US}$ (i.e. bits 211 to 226). The most significant 12 bits of these 16 bits are predicted.

Word 8 of subframe 2 also includes 8 bits which are the most significant bits of a 32 bit field called √A (i.e. bits 227 to 234). These 8 bits are predicted.

Word 9 of subframe 2 includes 24 bits which are the least significant bits of the 32 bit field called √A (i.e. bits 241 to 264). These most significant 14 bits of these 24 bits are predicted.

As shown in FIG. 9, 16 bits of Word 3 of subframe 2 (i.e. bits 61 to 76) are called $C_{ic}$ bits. The most significant 12 bits of these 16 bits are predicted.

Word 4 of subframe 3 contains 24 bits (i.e. bits 91 to 114) which are the least significant bits of a 32 bit field known as $\Omega_0$ bits. The most significant 22 bits of these 24 bits are predicted.

As further shown in FIG. 9, word 5 of subframe 23 also includes 16 bits (i.e. bits 121 to 136) which are called $C_{is}$ bits. The most significant 12 bits of these 16 bits are predicted.

As further shown in FIG. 9, word 6 of subframe 3 includes 24 bits (i.e. bits 151 to 174) which are the least significant bits of a 32 bit field called $i_0$. The most significant 22 bits of these 24 bits are predicted.

Word 7 of subframe 3 includes 16 bits called $C_{rc}$ (i.e. bits 181 to 196). The most significant 10 bits of these 16 bits are predicted.

As further shown in FIG. 9, word 7 of subframe 3 also includes 8 bits which are the most significant bits of a 32 bit field called ω (i.e. bits 197 to 204). These 8 bits are predicted.

Word 8 of subframe 3 includes 24 bits which are the least significant bits of the field called ω (i.e. bits 211 to 234). The most significant 6 bits of these 24 bits are predicted.

Word 9 of subframe 3 includes 24 bits called Ω (i.e. bits 241 to 264). The most significant 17 bits of these 24 bits are predicted.

With reference to FIG. 3, and as discussed above, subframes 4 and 5 contain almanac parameters. As is known, almanac information is very large, and so requires multiple frames (i.e. pages) to download an entire set of almanac information.

FIG. 9 illustrates bits in pages 1 to 24 of subframe 5 that can be determined a priori and/or predicted according to embodiments of the invention. For example, 70% of the bits in words 1 to 10 of subframe 5 can be determined via ephemeris to almanac conversion. Those skilled in the art will recognize that almanac parameters can be determined based on corresponding ephemeris parameters using similar techniques as is used in ephemeris prediction, but somewhat in reverse. In other words, the orbit prediction results in orbit parameters that are very similar to the GPS ephemeris/almanac, which are themselves orbit prediction parameters, so as an example if we predict the future value of the semi-major access of the satellite orbit this is then directly relatable to the square root of semi-major axis parameter that is contained in both ephemeris and almanac parameters.

Figure 10:
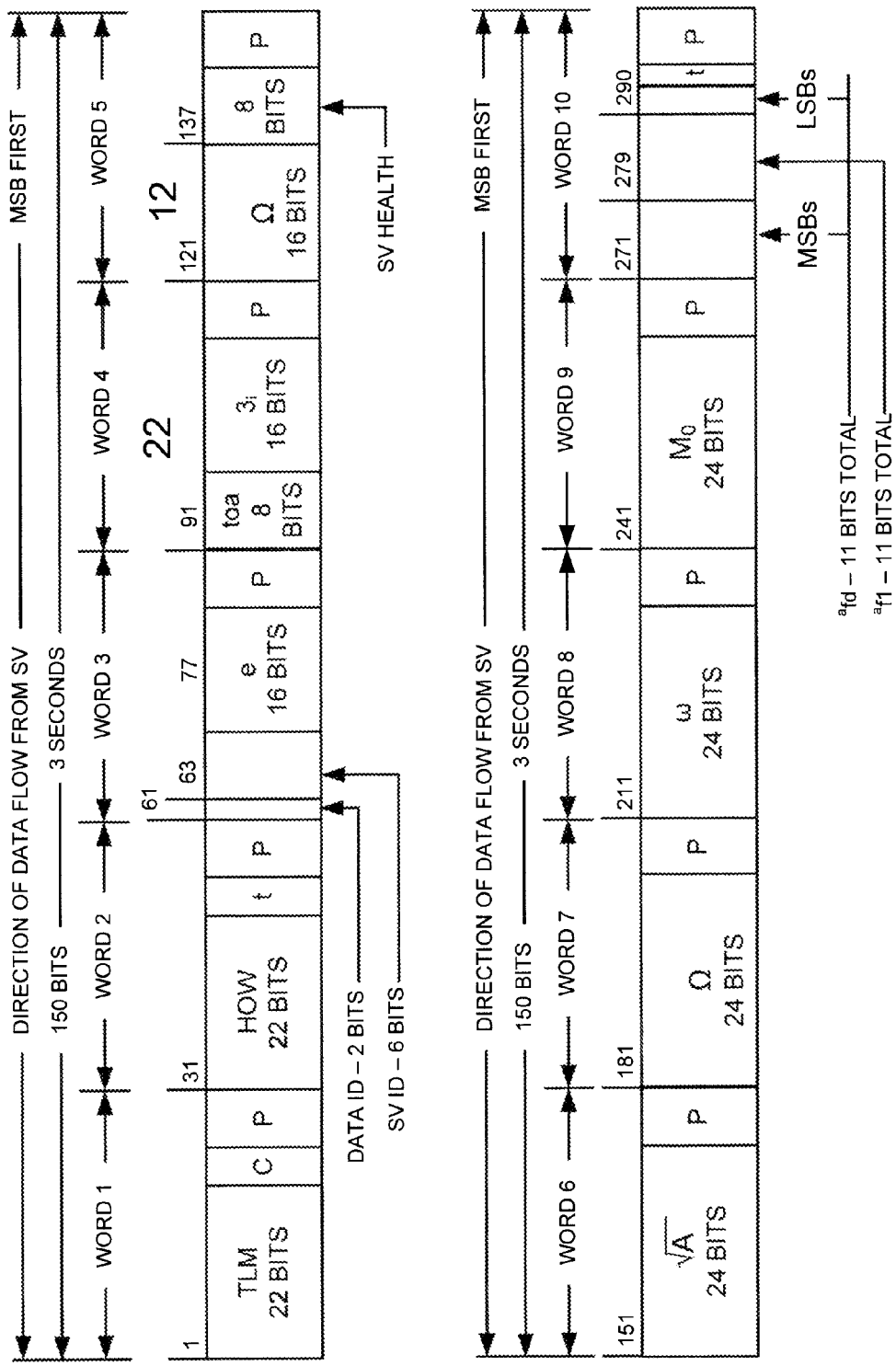

FIG. 10 illustrates bits in page 25 of subframe 5 that can be determined a priori and/or predicted according to embodiments of the invention. For example, 70% of the bits in words 1 to 10 of subframe 5 are known from the value of the SV health bits, assuming the health of all SVs is perfect.

Figure 11:
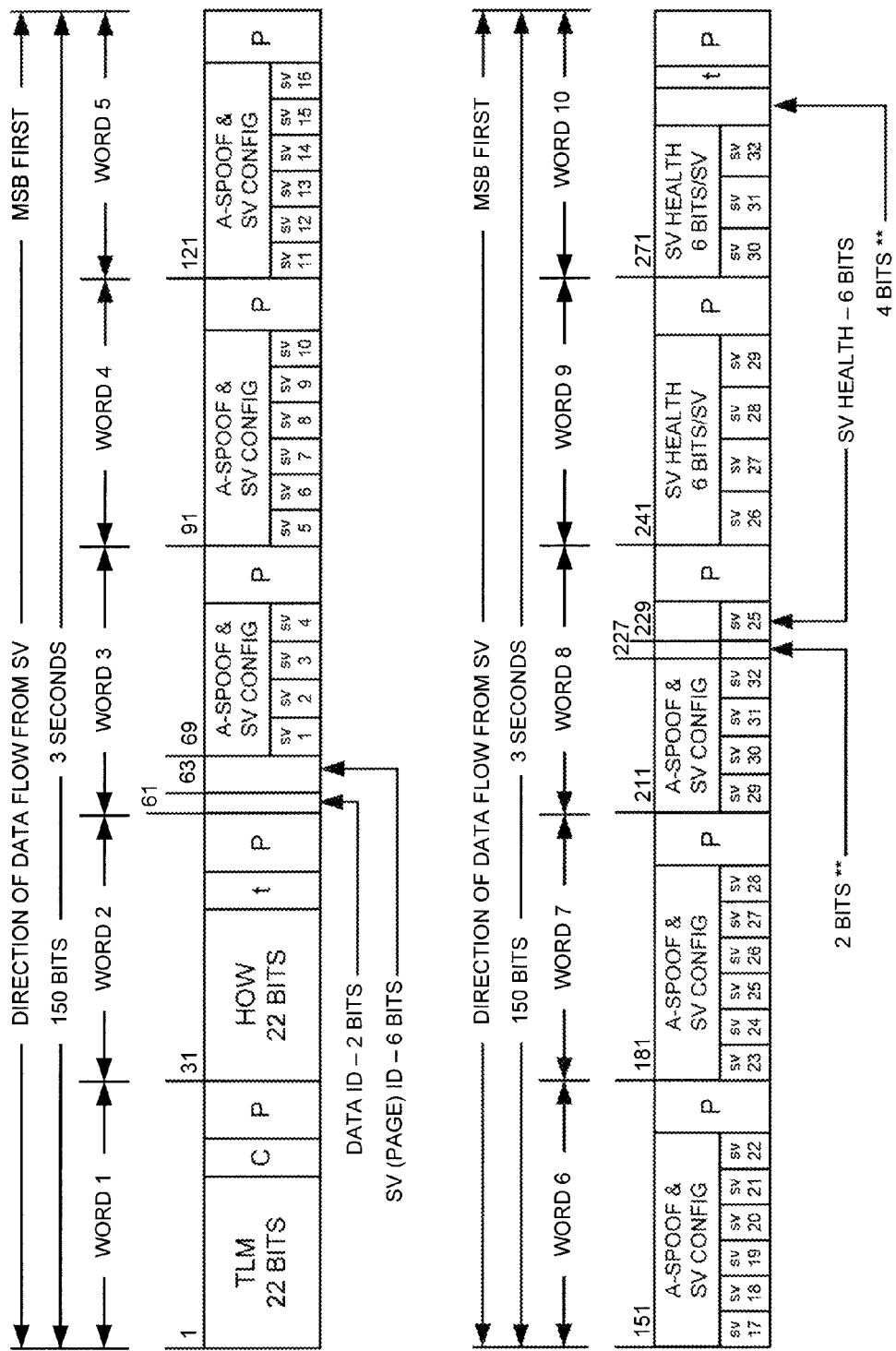

FIG. 11 illustrates bits in page 25 of subframe 4 that can be determined a priori and/or predicted according to embodiments of the invention. For example, 20% of the bits in words 1 to 10 of subframe 4 are known from the value of the SV health bits, assuming the health of all SVs is perfect.

It should be apparent that the above-described methods for predicting or assuming bits in TLM/HOW words, ephemeris and almanac are not necessarily fixed. For example, some assumptions (e.g. SV health bits) can be changed after synchronization has been performed and the actual bits are determined. These changed bits can then be used to update the receiver's database for subsequent prediction operations.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for synchronizing to first and second signals from different respective signal sources in a positioning system, the method comprising:
    determining respective first correlation values at a plurality of time offsets for the first signal;
    determining respective second correlation values at the plurality of time offsets for the second signal, wherein the first and second correlation values are both determined using a common set of predicted data bits in a positioning system data frame;
    time aligning the first and second signals;
    combining the determined first and second correlation values at the plurality of time offsets after time alignment; and
    identifying a peak combined correlation value at one of the plurality of time offsets.

2. A method according to claim 1, further comprising determining whether the peak combined correlation value corresponds to successful synchronization.

3. A method according to claim 1, wherein the first and second correlation values are determined using I and Q values derived from the first and second signals, respectively.

4. A method according to claim 1, wherein the step of time aligning includes:
    determining a difference in respective travel times of the first and second signals;
    aligning the plurality of time offsets for the first and second signals based on the determined difference.

5. A method according to claim 1, wherein the step of time aligning includes:
    obtaining an estimated position of respective transmitters of the first and second signals;
    obtaining an estimated position of a common receiver of the first and second signals;
    determining a difference in respective travel times of the first and second signals based on the obtained estimated positions;
    aligning the plurality of time offsets for the first and second signals based on the determined difference.

6. A method according to claim 5, wherein the estimated positions are obtained from a network.

7. A method according to claim 5, wherein the estimated positions are obtained from stored information that is retrieved in a hot start of the common receiver.

8. A method according to claim 5, wherein the respective transmitters are borne by respective satellite vehicles.

9. A method according to claim 1, further comprising:
    identifying a signal quality of the one or more signals;
    selecting the first and second signals from among the signals based on the identified signal quality before the combining step.

10. A method according to claim 2, wherein the determining step includes comparing the combined correlation value to a threshold corresponding to a probability of success.

11. A method according to claim 2, wherein the determining step includes identifying the corresponding time offset of the peak combined correlation value as a frame boundary.

12. A device that performs the method of claim 1.

13. A method for synchronizing to one or more signals from respectively different signal sources in a positioning system, the method comprising:
    synchronizing to a common data frame interval in the signals, including:
        identifying a combined peak correlation value at one of a plurality of aligned time offsets in two or more of the signals, wherein the combined peak correlation value is determined by correlating signal values from the two or more signals with a common set of predicted data bits in the common data frame interval.

14. A method according to claim 13, wherein the synchronizing step further includes comparing the combined peak correlation value to a threshold of success.

15. A method according to claim 13, wherein the combined peak correlation value is determined using I and Q values derived from all of the signals.

16. A method according to claim 13, wherein the plurality of aligned time offsets are determined by:
    determining a difference in respective travel times of the signals;
    aligning a plurality of respective time offsets for the signals based on the determined difference.

17. A device that performs the method of claim 13.

18. A method for synchronizing to one or more signals in a GPS positioning system, the method comprising:
    predicting a plurality of bits in addition to a recurring 8-bit preamble of a sub-frame in the one or more signals; and
    synchronizing to a common data frame interval in the signals, including:
        using the plurality of bits to form correlation values at a plurality of time offsets in the one or more signals, and
        identifying a peak correlation value at one of a plurality of time offsets in the one or more signals.

19. A method according to claim 18, wherein the synchronizing step further includes comparing the combined peak correlation value to a threshold of success.

20. A method according to claim 18, wherein the plurality of bits include bits of a plurality of ephemeris parameters in one or more sub-frames.

21. A method according to claim 18, wherein the plurality of bits include bits of a plurality of almanac parameters in one or more sub-frames.

22. A method according to claim 18, wherein the plurality of bits include a plurality of SV health bits in one or more sub-frames.

23. A device that performs the method of claim 18.

* * * * *

UNITED STATES PATENT AND TRADEMARK OFFICE
CERTIFICATE OF CORRECTION

Page 1 of 1

PATENT NO. : 8,134,501 B2
APPLICATION NO. : 13/083498
DATED : March 13, 2012
INVENTOR(S) : Lennen et al.

It is certified that error appears in the above-identified patent and that said Letters Patent is hereby corrected as shown below:

In Column 4, Line 49, delete "deter mined" and insert -- determined --, therefor.

Signed and Sealed this
Thirteenth Day of November, 2012

David J. Kappos
*Director of the United States Patent and Trademark Office*